United States Patent
Finegan

[11] Patent Number: 6,061,205
[45] Date of Patent: May 9, 2000

[54] SLIDER SUPPORT ASSEMBLY AND METHOD

[76] Inventor: Joel D. Finegan, 4050 Rio Ct., San Jose, Calif. 95134

[21] Appl. No.: 09/016,841

[22] Filed: Jan. 30, 1998

[51] Int. Cl.[7] .................................................. G11B 5/48
[52] U.S. Cl. ............................................... 360/104
[58] Field of Search ..................... 360/104–106

[56] References Cited

U.S. PATENT DOCUMENTS

| | | | |
|---|---|---|---|
| 5,079,660 | 1/1992 | Yumura et al. | 360/104 |
| 5,142,424 | 8/1992 | Hatamura | 360/104 |
| 5,225,950 | 7/1993 | Crane | 360/104 |
| 5,386,331 | 1/1995 | Wolter | 360/104 |
| 5,452,158 | 9/1995 | Harrison et al. | 360/104 |
| 5,608,590 | 3/1997 | Ziegler et al. | 360/104 |
| 5,682,669 | 11/1997 | Harrison et al. | 360/104 |

OTHER PUBLICATIONS

IDEMA Standards Binder, Reference Diagrams 2 and 5 (Rev. Dec. 1995/new).

McAllister, IEEE Trans. Magnetics. vol. 32, No. 3 pp. 1762–1755 (May 1996).

*Primary Examiner*—Allen T. Cao
*Attorney, Agent, or Firm*—Claude A.S. Hamrick; Oppenheimer Wolff & Donnelly

[57] ABSTRACT

A slider support assembly (20) includes a support arm (2) extendible over a magnetic disk (8). A slider (4), including a data head (12), is mounted to the support arm. The slider is mounted so the slider can pivot in a radially oriented roll plane (18) about an effective roll axis (44). The effective roll axis is typically located centrally beneath the slider, preferably about half-way through the disk. By moving the effective roll axis from a position above the data surface, as found with conventional gimbal-type slider supports, to a point below the data surface, pivotal radial movements of the slider relative to the data surface due to flutter of the data surface are reduced or eliminated. This helps to prevent track misalignment between the data head and data track caused by flutter or other excursions of the disk while spinning.

32 Claims, 3 Drawing Sheets

SLIDER SUPPORT ASSEMBLY AND METHOD

BACKGROUND OF THE INVENTION

Data are commonly read from and written to spinning magnetic disks. The disks commonly have a series of closely spaced, concentric data tracks. A slider, including a data head, is mounted to a support arm which biases the slider towards the data surface of the disk. The slider is typically an air bearing slider and is supported just above the spinning data surface of the disk by a thin film of air. An actuator incrementally moves the support arm so the slider is indexed to be registered with the desired data track.

To accommodate small manufacturing offsets in the slider surface relative to the data surface as well as small tilt variations caused by the movement of the data surface, the slider is typically mounted to the support arm through a gimbal arrangement. This gimballed mounting of the slider to the support arm permits the slider to pivot about a tangentially-directed axis in a radially-oriented plane, such pivotal movement commonly called roll, and about a radially-oriented axis in a tangentially-oriented plane, such movement commonly called pitch. This movement is illustrated in FIG. 1.

One problem associated with the manufacture of hard disk drives is that in an effort to get more information on the same size disk, the data tracks are spaced closer together. Presently, hard disks typically have about 4000 to 10,000 tracks per inch (about 1575 to 3900 tracks per cm); track densities of up to about 25,000 tracks per inch (about 9800 tracks per cm) are contemplated and even higher densities are expected in the future. These higher track densities and higher rotational speeds combine to increase the problem of misregistration of the data head with the data track. One article discussing this disk misregistration problem states: "Current high performance disk drives have track densities approaching 6,000 TPI, or 166 micro inches between tracks. The head positioning servo system must hold the read/write element within 12% of the center of the track which means that relative radial displacement between the head and disk must be no more than 20 micro inches. At these high track densities, effects which were formally negligible now contribute significantly to track misregistration (TMR) in the 3.5 inch disk drives." ("The Effect of Disk Platter Resonances on Track Misregistration in 3.5 Inch Disk Drives," *IEEE Transaction Magnetics,* Vol. 32, No. 3, May 1996, pp. 1762–1766.) With the track densities heading towards the 10,000 to 25,000 tracks per inch range, track misregistration problems become even more severe.

Disks have natural vibration modes, each characterized by a particular resonant frequency. At these frequencies the disk movement will be amplified by the resonant response to even small excitations. The driving excitations can be produced by imperfect bearings and motors as well as by aerodynamic instabilities in the air flow across the disk surface, particularly at the higher rotation rates. Although these vibrations are most easily characterized by the movement of the outer regions of the disk in a direction perpendicular to the surface, this motion necessarily must produce a tilting of the disk surface since the disks are clamped at the inside radius. It can be shown that the neutral plane of the disk, the plane at the middle of the thickness, does not move radially to any significant degree. Due to the finite thickness of the disk, the tilting requires that the slider surface and the disk surface must move in opposite radial directions depending on the sense of the tilt. In latest drives these radial motions are large enough and at a high enough frequency as to challenge the ability of the drive servos to keep the heads centered on the data tracks.

SUMMARY OF THE INVENTION

The present invention is directed to a slider support assembly and method for supporting the slider which helps to prevent, or at least minimize, radial motion of the slider relative to the data surface as the disk tilts in response to disk vibration.

The present invention recognizes that a gimbaled slider contributes to the relative motion of the data track and slider. The stiffness of the air bearings will assure that the slider will follow the tilt motion of the disk. Since, in the conventional slider suspension, the slider is designed to rotate about an axis which is located at or above the top surface of the slider, this rotation will result in a radial translation of the head across the data surface in a direction opposite to that of the track displacement. Thus it adds to the misalignment. Nothing can be done about the contribution of the disk to the problem. However, the effect of this track motion can be minimized if the slider suspension can be reconfigured in a way to make the slider response to tilt match that of the track, and thereby eliminating or minimizing the head/track relative motion. The present invention provides for the accomplishment of this goal by locating the roll axis of the slider to coincide with the roll axis of the disk, at the center plane of the disk.

The slider support assembly includes a support arm extendible over the data surface of a substrate, typically a magnetic disk. A slider, including a data head, is mounted to the support arm. The slider is mounted so the slider can pivot in a radially oriented plane about an effective roll axis located within the disk.

The effective roll axis is typically located centrally beneath the slider, preferably generally centered half way through the disk. By moving the effective roll axis from a position above the data surface, as found with conventional gimbal-type slider supports, to a point below the data surface, pivotal radial movements of the slider relative to the data surface due to tilting of the data surface are reduced or eliminated.

According to the method aspect of the invention, the slider is supported along the data surface of the spinning disk by positioning the slider so the data head is aligned with a data track. Tilting movement of the data surface is accommodated by mounting the slider for pivotal movement in a roll plane about an effective roll axis. The roll plane is oriented generally perpendicular to the data track, that is, in a generally radial direction. The effective roll axis is oriented perpendicular to the roll plane and is located within the disk, preferably generally centered half-way through the disk.

As used in this application, radial and tangential refer to those directions defined by the data tracks. Also, the terms above and below the data surface refer to these directions when the data substrate is generally horizontal and the data surface is the upper surface. However these terms are intended to cover other situations, such as when the data substrate is at a 45° angle and the data surface is generally downwardly-facing; in this situation "above" the data surface is actually downward and away from the data surface.

A primary advantage of the invention is the recognition that flutter or other excursions of the data substrate, especially near the outer edge of a spinning disk, (1) involves very small angular distances as measured from the center of the disk, and (2) can be thought of as a twisting of the disk about a position centrally beneath the slider and generally centered within the body of the disk. Therefore, by pivotally mounting the slider so its effective roll axis passes through the disk, or other substrate, and preferably half-way through the disk, relative radial sliding movement due to disk tilting can be minimized or eliminated.

This pivotal mounting in the radially oriented roll plane is preferably provided using a pivotal mounting structure to mount the slider to the support arm. This pivotal mounting structure preferably uses a trapezoidal suspension. In one embodiment a pair of links extend from the slider to the distal end of the support arm. The links are pivotally mounted at each of their ends or are effectively pivotally mounted by or through flexible or elastic couplings at each of their ends. The links diverge outwardly away from one another as they extend from the slider to the support arm. The lengths and orientations of the links are designed so that the effective roll axis of the slider lies within the body of the disk, and preferably half-way through of the body of the disk. With the trapezoidal suspension, the support arm is typically a radially-extending support arm; the support arm could extend at other orientations, such as tangentially to the data tracks.

Another embodiment of the pivotal mounting structure for the slider is provided by rotatably mounting the proximal end of the support arm to the actuator. This rotatable mounting of the support arm allows the support arm to pivot about a support arm axis, the support arm axis preferably passing through a point centered beneath the slider midway through the thickness of the disk. In this case, the effective roll axis of the slider would be defined by the support arm axis and would be located about half-way through the body of the disk, rather than above the data surface of the disk as is conventional, to help keep the data head aligned with the data track as the disk undergoes flutter.

The roll axis has been described as an effective roll axis. This is because the location of the actual roll axis of the slider may shift or move as, for example, the links pivot. That is, during use the slider may define a range of locations for its roll axis, all a short distance from the average or effective roll axis. The change in position of the actual roll axis is small because the excursions of the data surface are small. Therefore this range of roll axes can be characterized as an effective roll axis.

Other features and advantages will appear from the following description in which the disclosed embodiments are set forth in detail in conjunction with the accompanying drawings.

DESCRIPTION OF THE PREFERRED EMBODIMENT

Figure 1:
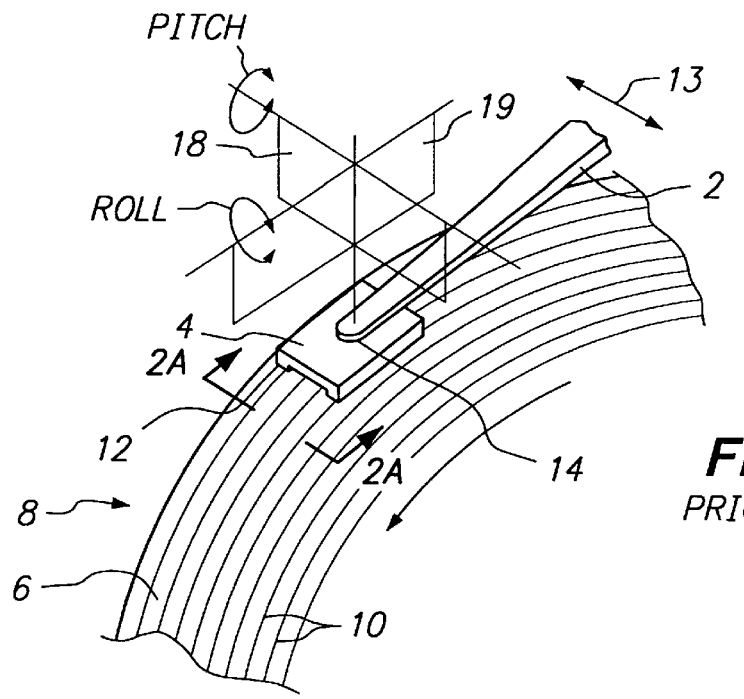
FIG. 1 illustrates a conventional air bearing slider mounted to the distal end of a tangentially-oriented support arm through a gimballed slider support, the figure illustrating pivotal movement of the slider in a radially-oriented roll plane and in a tangentially-oriented pitch plane.

FIG. 1 illustrates a conventional support arm 2 supporting an air bearing slider 4 above the data surface 6 of a spinning disk 8. Disk 8 has a series of closely spaced data tracks 10, such as 6,000 tracks 10 per radial inch. Slider 4 has a data head 12 which is alignable with selected ones of data tracks 10 through the radial movement of support arm 2 by an actuator, not shown in FIG. 1, in the direction of arrow 13.

Figure 2A:
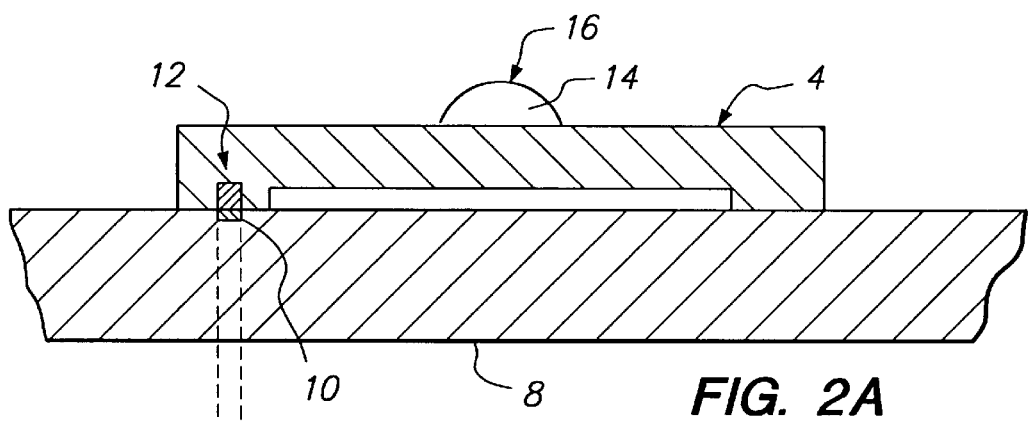
FIG. 2A schematically illustrates a conventional gimballed slider with the head properly oriented with a track of the disk.

FIG. 2A is a simplified enlarged view of the conventional disk and slider taken along line 2A—2A of FIG. 1 illustrating the gimballed slider support 14 having a pivot point 16 located above slider 4. Gimballed support 14 provides for pivotal movement in the radially directed roll plane 18, as well as in the tangentially directed pitch plane 19.

Figure 2B:
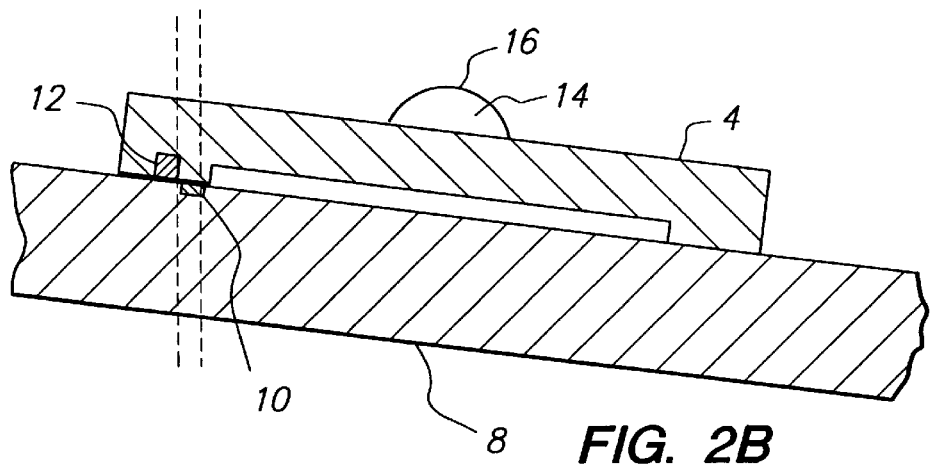
FIG. 2B illustrates the slider and disk of FIG. 2A, after flutter of the disk caused the disk to effectively tilt causing the track to move to the right and the head to move to the left so the head becomes misaligned with the track.

FIG. 2B illustrates the elements of FIG. 2A after disk 8 has been deflected due to disk flutter; the deflection is exaggerated for purposes of illustration. Comparing FIGS. 2A and 2B, it is seen that because slider 4 been pivoted around pivot point 16, data track 10 and data head 12 slide relative to one another in a radial direction, that is in roll plane 18, with data head 12 moving to the left and data track 10 moving to the right. Data head 12 and data track 10 are no longer aligned resulting in track misregistration.

Figure 3:
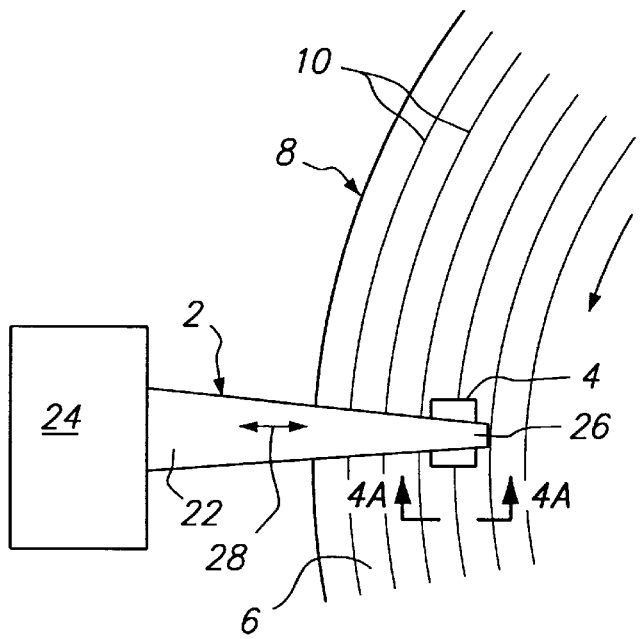
FIG. 3 illustrates, in simplified form, a slider support assembly made according to the invention using a radially-directed support arm.

FIG. 3 shows a slider support assembly 20 made according to the invention. Support assembly 20 has many of the same elements illustrated in FIGS. 1–2B so that like elements will be referred to with like reference numerals. The proximal end 22 of support arm 2 extends from an actuator 24 which indexes the distal end 26 of support arm 2, and slider 4 therewith, to different radial positions as indicated by arrow 28. Radially-extending support arm 2 could be oriented in a different direction, such as tangentially as in FIG. 1.

Figure 4A:
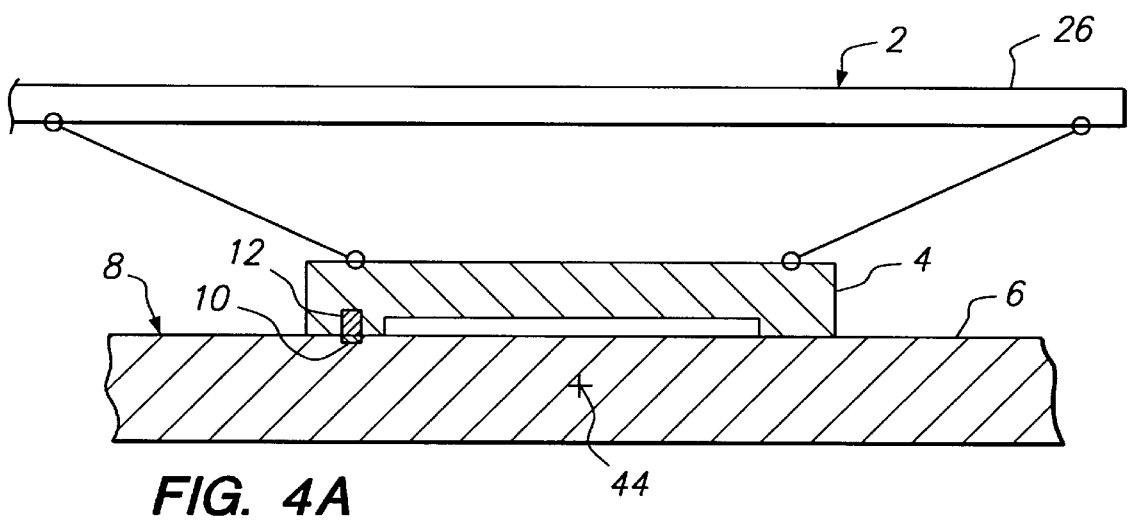
FIG. 4A is a simplified side view, taken along line 4A—4A of FIG. 3, of the distal end of the support arm, the slider and a portion of the disk showing a trapezoidal suspension supporting the slider adjacent to the data surface of the disk with the data head and data track aligned.

In comparing FIGS. 4A and 2A, it is seen that gimballed slider support 14 has been replaced by a trapezoidal suspension 30 for pivotal movement about a roll axis. Trapezoidal suspension 30 includes a pair of links 32, 34 secured at their lower ends 36, 38 to slider 4 and at their upper ends 40, 42 to distal end 26 of support arm 2. The junctions of ends 36, 38, 40, 42 with slider 4 and support arm 2 are effectively pivotal connection points. That is, these junctions can be true pivotal connections or can be, for example, elastic connections which effectively function as pivotal connections. Trapezoidal suspension 30 is used to permit slider 4 to pivot in roll plane 18. Other, typically conventional, mounting structure, not shown, can be used to provide for the pivotal mounting of slider 4 to support arm 2 for movement in pitch plane 19.

The lengths and orientations of links 32, 34 provide an effective roll axis 44 located essentially beneath slider 4 and at about half-way through the thickness of disk 8. That is, for small rolling motions (pivotal motions in roll plane 18) of slider 4, roll axis 44 remains generally centered within disk 8. Therefore, as disk 8 deflects, slider 4 moves with the disk and undergoes insignificant relative sliding motion along roll plane 18. This is indicated by the fact that data head 12 and data track 10 remain aligned as slider 4 and disk 8 move from the configuration of FIG. 4A to the configuration of FIG. 4B.

Figure 4B:
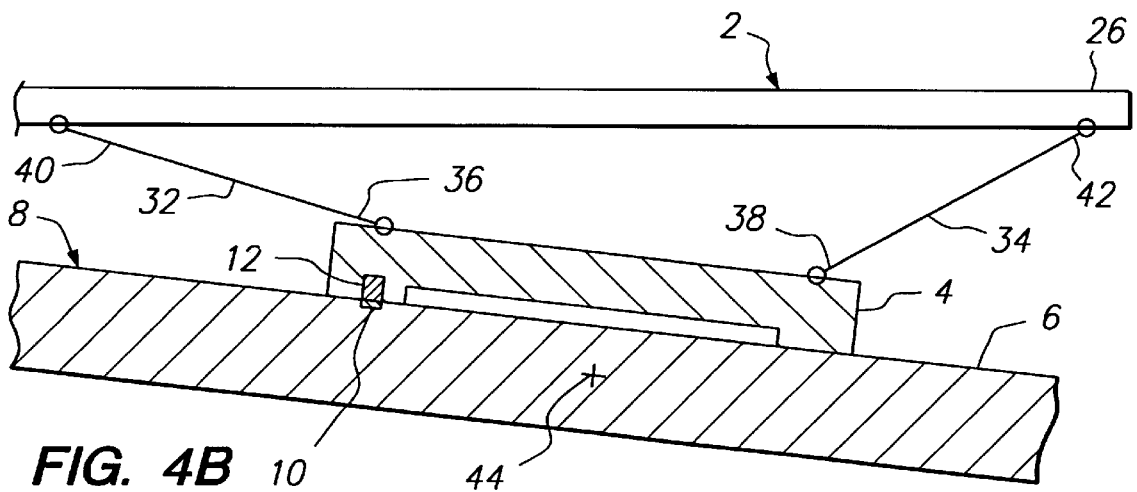
FIG. 4B illustrates the result of flutter of the disk in which the data surface has been shown, in exaggerated form, to have been tilted relative to the support arm thus causing the links of the trapezoidal suspension to pivot but showing that the data head and data track remain substantially aligned due to the pivotal movement of the slider about an effective roll axis passing through the center of the body of the disk.

The lengths, locations, angles and configurations of links 32, 34 determine the location of roll axis 44. While movement of disk 8 as indicated in FIGS. 4A and 4B will cause the location of roll axis 44 to shift, the amount of shift is small so that the effective roll axis location can be considered stationary.

Figure 5A:
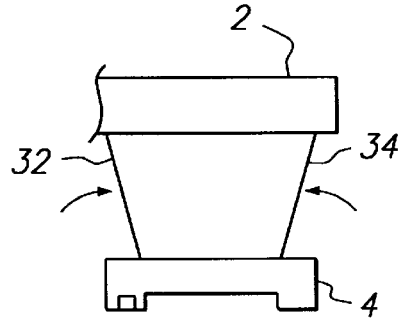
FIG. 5A illustrates the effect on the position of the effective roll axis of FIGS. 4A and 4B as the links are pivoted inwardly so that their upper ends are closer to one another causing the roll axis to move, in the figure, downwardly.

FIG. 5A illustrates what would happen to roll axis 44 if upper ends 40, 42 of links 32, 34 were moved closer to one another, but not so close that links 32, 34 are parallel. The location of roll axis 44 in this event would move in the direction of arrow 46, that is, much farther away from slider 4.

Figure 5B:
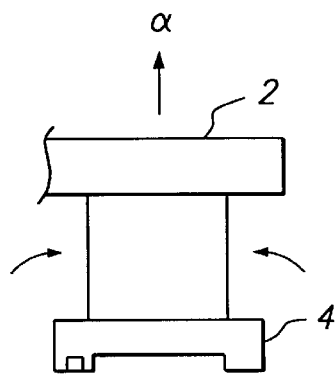
FIG. 5B illustrates the situation in which the two links are parallel to one another which results in the roll axis being located at infinity, in this figure infinity being above the slider.
Figure 5C:
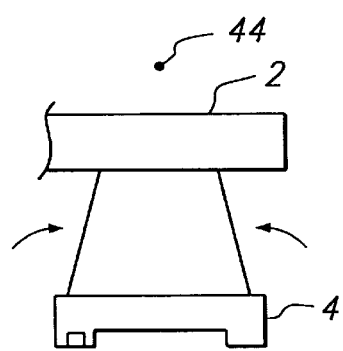
FIG. 5C illustrates the effect of continuing to move the upper ends of the links towards one another causing the roll axis to move downwardly towards the support arm, this position being similar to the roll axis position of the prior art slider of FIG. 2A.

FIG. 5B illustrates the fact that if links 32, 34 are made parallel to one another, suspension 30 becomes a parallelogram suspension so that the pivot point is effectively at infinity. That is, there would be no pivoting and thus no roll. FIG. 5C illustrates the result of continuing pivotal movement of links 32, 34 in the direction of the arrows so that their upper ends 40, 42 are closer together than their lower ends 36, 38. This causes roll axis 44 to move towards slider 4, in the example still above support arm 2.

Figure 6:
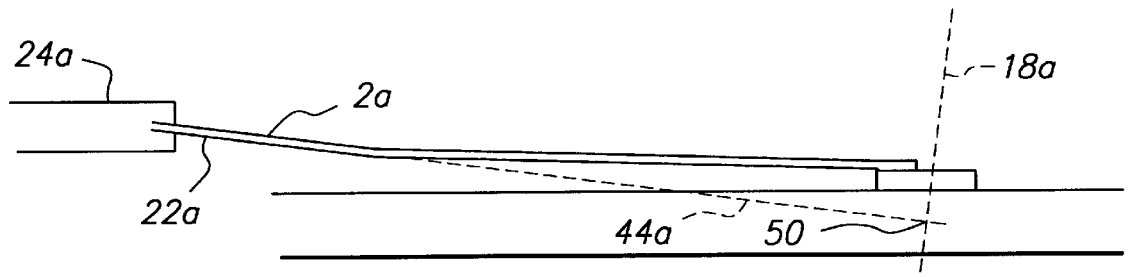
FIG. 6 is a simplified side view of an alternative embodiment of the invention in which the support arm is tangentially directed, similar to the support arm of FIG. 1, but in which the proximal end of the support arm is rotatably mounted to the actuator for rotational movement about a roll axis, the roll axis passing through a point located directly beneath the slider about half-way through the thickness of the disk.

FIG. 6 illustrates, in a very schematic form, an alternative embodiment of the invention in which support arm 2a is a tangentially oriented support arm, similar to the orientation of the support arm in FIG. 1. The proximal end 22a of support arm 2a is rotatably mounted to actuator 24a for relatively free rotational movement about a roll axis 44a. Roll axis 44a passes through a point 50 situated generally beneath slider 4 and midway through the thickness of disk 8. Doing so permits slider 4 to roll or pivot in roll-plane 18a to help maintain the alignment of data track 10 with data head 12 as shown in FIGS. 4A and 4B. It can be appreciated that the angles of roll axis 44a and roll plane 18a have been exaggerated for purposes of illustration.

Figure 7:
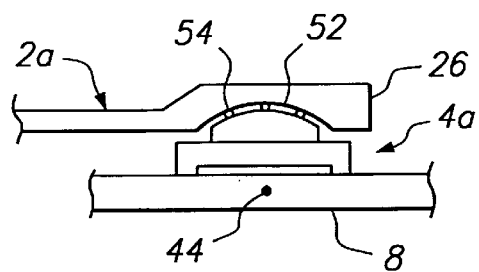
FIG. 7 is a simplified side view of a further embodiment of the invention.

Slider 4 could be mounted to the distal end 26 of a support arm 2a as shown in FIG. 7. Support arm 2a has a semi-spherical surface 52 engaging a plurality of low-friction bearings 54 carried by slider 4a. Surface 52 is sized so that its center is coincident with roll axis 44 centered within disk 8. Bearings 54 could be replaced by very short spacer links; because of the very small movements involved, short spacer links would act similarly to bearings 54 causing slider 4a to pivot about roll axis 44.

The present invention is particularly adapted for use with magnetic disks. However, the invention can also be used with other data storage and retrieval technologies. For example, the invention can be used with a technology called solid immersion lens recording, a type of magneto-optical recording technology. TeraStar Corporation of San Jose, Calif. has been developing new field recording technology using a flying optical head with optical elements including a solid immersion lens. The invention would help to ensure proper alignment of the lens with the data tracks on a spinning disk. In this case the lens would act as the data head.

Other modifications and variations can be made to the disclosed embodiments without departing from the subject of the invention as defined in the following claims.

What is claimed is:

1. A slider support assembly, for use with a spinning data substrate having a data surface with a plurality of radially spaced apart data tracks, comprising:

a support arm extendable over a data substrate;

a slider comprising a data head; and means for pivotally supporting said slider against a data surface of the spinning data substrate with said data head alignable with data tracks of said data surface, said pivotally supporting means comprising means for pivotally mounting the slider to the support arm for pivotal movement in a generally radially-oriented plane about an effective roll axis, said effective roll axis being aligned with said slider and located within the data substrate, said pivotally mounting means including:

first and second links, each said link having arm and slider ends effectively pivotally mounted to the arm and slider, respectively;

said links being mounted for movement parallel to said generally radially-oriented plane; and said links diverging from one another as said links extend from said slider toward said support arm;

whereby relative radial movements of the slider and the data surface, due to tilting movements of the data surface, are controlled.

2. The assembly according to claim 1 wherein the support arm is a generally radially-extending support arm.

3. The assembly according to claim 1 wherein the slider is an air bearing slider.

4. A slider support assembly, for use with a spinning data substrate having a data surface with a plurality of radially spaced apart data tracks, comprising:

a support arm extendable over a data substrate;

a slider comprising a data head; and means for pivotally supporting said slider against a data surface of the spinning data substrate with said data head alignable with data tracks of said data surface, said pivotally supporting means comprising means for pivotally mounting the slider to the support arm for pivotal movement in a generally radially-oriented plane about an effective roll axis, said effective roll axis being aligned with said slider and located within the data substrate, said pivotally mounting means comprising bearing means positioned along a circular arc, said circular arc having a center at said effective roll axis;

whereby relative radial movements of the slider and the data surface, due to tilting movements of the data surface, are reduced.

5. The assembly according to claim 1 wherein said support arm is a generally tangentially-extending support arm.

6. The assembly according to claim 5 further comprising an actuator, and wherein said pivotally mounting means comprises means for rotationally mounting said support arm to said actuator for rotational movement about said effective roll axis.

7. The assembly according to claim 1 wherein said links are rigid members.

8. The assembly according to claim 1 wherein said effective roll axis is located generally centrally within the data substrate.

9. A slider support assembly, for use with a spinning magnetic disk having a data surface with a plurality of radially spaced apart data tracks, comprising:

a support arm extendable over a data substrate;

a slider, comprising a data head, mounted to the arm by a trapezoidal suspension, said trapezoidal suspension comprising:

first and second links, each said link having arm and slider ends effectively pivotally mounted to the arm and slider, respectively;

said links being mounted for movement parallel to a generally radially-oriented plane; and said links diverging from one another as said links extend from said slider toward said support arm;

whereby said trapezoidal suspension pivotally supports said slider against a data surface of the spinning magnetic disk with said data head alignable with data tracks of said data surface;

said links sized, located and oriented so tilting disk movement causes the slider to move in said generally radially-oriented plane about an effective roll axis, said effective roll axis being aligned with said slider and located within the data substrate;

whereby relative radial movements of the slider and the data surface due to such tilting disk movement are reduced.

10. A method for supporting a slider along a data surface of a spinning data substrate comprising the following steps:

positioning a slider, comprising a data head, at a data surface of a spinning data substrate with said data head aligned with a data track on said data surface; and accommodating tilting movement of said data substrate by at least:

pivotally mounting said slider for pivotal movement in a roll plane about an effective roll axis, said roll plane being oriented in a generally radial direction generally perpendicular to the data track, said effective roll axis being located within the data substrate, said pivotally mounting being carried out using bearing elements positioned along a circular arc having a center at said effective roll axis;

whereby relative sliding movement of the slider and the data surface in said roll plane is at least reduced to help keep the data head aligned with the data track.

11. A slider support assembly for use with a spinning data substrate having a center plane and a data surface with a plurality of radially spaced apart data tracks, comprising:

a support arm extendable over the data substrate;

a slider comprising an air-bearing surface and a data head;

means for supporting said slider and data head at a given height above and substantially parallel to the data surface of the spinning data substrate with said data head aligned with a given data track;

said support means including means for mounting the slider to the support arm through a gimbal arrangement which controls the motion of the slider and which allows the slider to roll relative to the support arm and to maintain said height and parallelism with the surface of the spinning data substrate; and said gimbal arrangement being configured to require the slider to pivot about a point located at or near the center plane of the spinning data substrate;

whereby relative movement of the slider and the data surface, due to tilting movement of the spinning data surface, is substantially eliminated and the data head maintains its alignment with the given data track.

12. A slider support assembly as recited in claim 11 wherein said gimbal arrangement also allows the slider to pitch relative to the support arm.

13. A slider support assembly as recited in claim 11 wherein said gimbal arrangement comprises:

elongated links attaching the slider to the support arm;

each said link having slider and support arm ends effectively pivotally mounted to the slider and support arm, respectively;

the longitudinal axes of said links converging towards one another, as said links extend from said support arm end to said slider end, such that projections of said links meet at a point which lies in the center plane of the spinning disk substrate.

14. A slider support assembly as recited in claim 11 wherein said gimbal arrangement includes:

hinge means attaching the slider to the support arm;

each said hinge means having elongated means effectively pivotally mounted to the slider and support arm, respectively;

said elongated means converging towards one another, as they extend from said support arm end to said slider end, such that projections of said elongated means would meet at a line which is in the center plane of the spinning disk substrate.

15. A slider support assembly as recited in claim 13 wherein said links are rigid members.

16. A slider support assembly as recited in claim 14 wherein said elongated means are rigid members.

17. A slider support assembly as recited in claim 11 wherein said gimbal arrangement comprises bearing means positioned along a spherical surface, said spherical surface being concave to the surface of the spinning data substrate and having its center of radius at the center plane of the spinning data substrate.

18. A slider support assembly as recited in claim 11 wherein said gimbal arrangement comprises bearing means positioned along a cylindrical surface, said cylindrical surface being concave to the surface of the spinning data substrate and having its center of radius at the center plane of the spinning data substrate.

19. A slider support assembly as recited in claim 11 wherein the support arm is a generally radially-extending support arm.

20. A slider support assembly as recited in claim 11 wherein said support arm is a generally tangentially-extending support arm.

21. A slider support assembly as recited in claim 20 wherein said gimbal arrangement includes means for rotationally mounting said support arm to the actuator for rotational movement of the support arm and slider about an axis which intersects the center plane of the spinning data substrate directly under said data head.

22. A slider support assembly for use with a spinning magnetic disk having a data surface with a plurality of radially spaced apart data tracks, comprising:

a support arm extendable over the data substrate;

a slider, comprising an air-bearing surface and a data head, mounted to the support arm by a trapezoidal gimbal, said trapezoidal gimbal comprising:

links having arm and slider ends effectively pivotally mounted to the arm and slider, respectively; said links converging towards one another as said links extend from said support arm end to said slider end, such that projections of said links meet at a point in the center plane of the spinning magnetic disk substrate;

whereby said trapezoidal gimbal pivotally supports said slider and data head against a data surface of the spinning magnetic disk with said data head alignable with data tracks of said data surface;

said links being sized, located and oriented so that tilting disk movement causes slider and data head to move in coincidence with the surface of the spinning magnetic disk;

whereby relative movement of the data head and the data surface due to such tilting disk movement is eliminated or reduced.

23. A slider support assembly for use with a spinning magnetic disk having a data surface with a plurality of radially spaced apart data tracks, comprising:

a support arm extendable over the data substrate;

a slider including an air-bearing surface and a data head, said slider being mounted to the support arm by a trapezoidal gimbal, including, hinge means having support arm and slider ends effectively pivotally mounted to the arm and slider, respectively; said hinge means converging towards one another as said hinge means extend from said support arm end to said slider end, such that projections of said hinge means meet at an effective roll axis which is in the center plane of the spinning magnetic disk substrate;

whereby said trapezoidal gimbal pivotally supports said slider and data head against a data surface of the spinning magnetic disk with said data head alienable with data tracks of said data surface;

said hinge means being sized, located and oriented so that tilting disk movement causes slider and data head to move in coincidence with the surface of the spinning magnetic disk;

whereby relative movement of the data head and the data surface due to such tilting disk movement is substantially eliminated.

24. A slider support assembly for use with a spinning magnetic disk having a data surface with a plurality of radially spaced apart data tracks, comprising:

a support arm extendable over the data substrate;

a slider including an air-bearing surface and a data head mounted to the support arm by a spherical gimbal, said spherical gimbal including:

two spherical surfaces, one said spherical surface being effectively mounted to the slider and the other to the support arm;

said two spherical surfaces having their centers of radii at a common point that is in the center plane of the spinning magnetic disk substrate;

whereby said spherical gimbal pivotally supports said slider and data head against a data surface of the spinning magnetic disk with said data head alienable with data tracks of said data surface;

said spherical surfaces being sized, located and oriented so that tilting disk movement causes slider and data head to move in coincidence with the surface of the spinning magnetic disk; and whereby relative movement of the data head and the data surface due to such tilting disk movement is substantially eliminated.

25. A slider support assembly for use with a spinning magnetic disk having a data surface with a plurality of radially spaced apart data tracks, comprising:

a support arm extendable over the data substrate;

a slider including an air-bearing surface and a data head mounted to the support arm by a cylindrical gimbal, said cylindrical gimbal including:

two cylindrical surfaces one of which is effectively mounted to the slider and the other is the support arm;

said two cylindrical surfaces having their centers of radii meeting at an effective roll axis which is in the center plane of the spinning magnetic disk substrate;

whereby said cylindrical gimbal pivotally supports said slider and data head against a data surface of the spinning magnetic disk, said data head being alignable with data tracks of said data surface;

said cylindrical surfaces being sized, located and oriented so that tilting disk movement causes slider and data head to move in coincidence with the surface of the spinning magnetic disk; and whereby relative movement of the data head and the data surface due to such tilting disk movement is substantially eliminated.

26. A method for supporting a slider adjacent to a data surface of a spinning data substrate comprising the following steps:

positioning a slider including an air-bearing surface and a data head at a data surface of a spinning data substrate with said data head aligned with a data track on said data surface; and accommodating tilting movement of said data substrate by pivotally mounting said slider for pivotal movement about a point located at or near the center plane of the spinning data substrate;

whereby relative movement of the slider and the data surface due to tilting movement of the spinning data surface, is substantially eliminated and the data head maintains its alignment with the data track.

27. A method as recited in claim 26 wherein said pivotally mounting step is carried out using a generally trapezoidal gimbal.

28. A method as recited in claim 26 wherein said pivotally mounting step is carried out using links to couple the slider to a support arm in a trapezoidal arrangement.

29. A method as recited in claim 26 wherein said pivotally mounting step is carried out using hinge means to couple the slider to a support arm in a trapezoidal arrangement.

30. A method as recited in claim 26 wherein said pivotally mounting step is carried out by rotationally mounting a support arm to which the slider is mounted to an actuator so that the support arm and slider are rotatable about an axis which intersects the center plane of the spinning data substrate directly under said data head.

31. A method as recited in claim 26 wherein said pivotally mounting step is carried out using spherical surfaces to couple the slider to a support arm.

32. A method as recited in claim 26 wherein said pivotally mounting step is carried out using cylindrical surfaces to couple the slider to a support arm.

* * * * *